June 16, 1959  J. BAIOCCHI  2,890,662
MACHINE FOR EXTRUDING MEASURING, CUTTING
AND APPLYING EDIBLE MATERIAL
Filed July 31, 1957  3 Sheets-Sheet 1

INVENTOR.
JOHN BAIOCCHI
BY Harry H. Hitzeman
ATTORNEY

INVENTOR
JOHN BAIOCCHI
By Harry H. Hitzeman
ATTORNEY.

2,890,662

MACHINE FOR EXTRUDING MEASURING, CUTTING AND APPLYING EDIBLE MATERIAL

John Baiocchi, La Grange Park, Ill.

Application July 31, 1957, Serial No. 675,363

3 Claims. (Cl. 107—14)

My invention relates to machines for extruding, measuring, cutting and applying edible material and to similar mechanism.

My invention relates more particularly to a machine of the type described that is especially adapted for use in the making of pizza.

As is well known in the art, pizza is a food product or dish which has become quite popular in the United States in the last decade, having originated in Italy and adjacent southern European countries. The food product is in the nature of a pie that has a thin flat bottom crust and the mixture that is applied to the dough and baked usually consists of a layer of tomato sauce, covered with cheese, with mushrooms, sausage slices, anchovies or any preferable food product which strikes the fancy of the producer. The dough, together with the assortment of food products above mentioned, is then placed in the oven and baked until done, and the pizza is then eaten preferably while still hot. Because the shape is normally round, the product is commonly known as a pizza pie.

Because of the popularity of this product, a large number of pizza pie parlors or restaurants have sprung up throughout the country, and the making of the same in quantity has become somewhat of a mass production problem.

The principal object of the present invention is to provide a machine for use in making pizza pies.

A further object of the invention is to provide a machine of the type described which will extrude upon the surface of the pie dough a measured quantity of an ingredient such as chunks of meat or sausage evenly distributed thereon and of a uniform thickness throughout.

A further object of the invention is to provide a machine of the type described that will produce the above results in a quick and expeditious manner so that the making of pizza pies can be greatly accelerated.

A further object of the invention is to provide a machine of the type described that may be either manually operated by a single operator, or may have power mechanism to drive the moving parts, the same being under the control of a single operator.

For a more comprehensive understanding of the invention and the mechanism which I employ in carrying out the objects of the same, reference is had to the following specification and the accompanying drawings upon which one embodiment thereof is illustrated.

Figure 1:
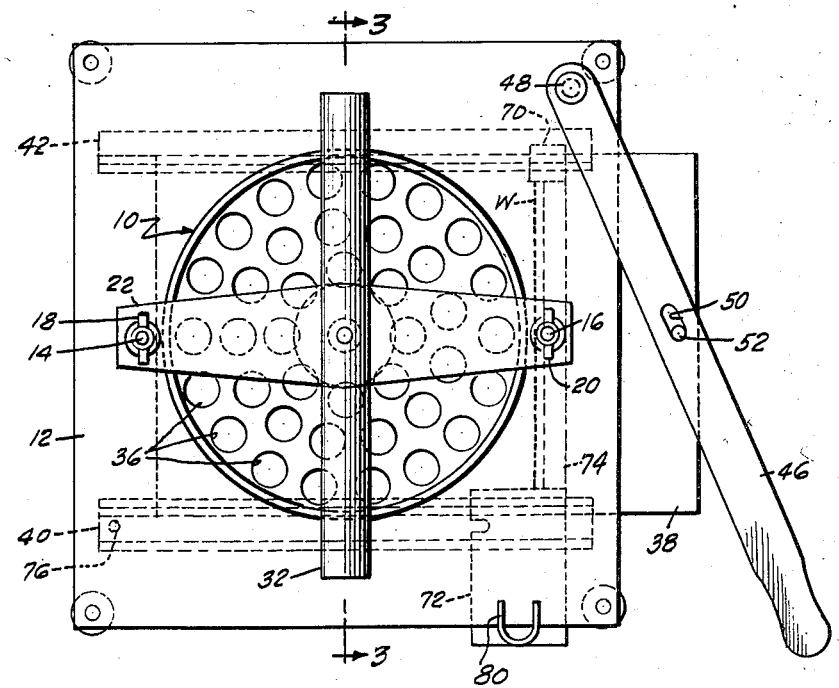
Fig. 1 is a plan view of one machine embodying my invention.

In the embodiment of the invention which I have chosen to illustrate and described the same, the construction may generally consist of a cylinder 10 that is fastened on a base plate or horizontal platform 12 by means of a pair of vertically disposed rods 14 and 16, the rods 14 and 16 being provided with countersink heads that are fastened in countersunk openings in the bottom of the base or platform 12 and extend upwardly therefrom, being screw-threaded at their upper ends to receive the wing nuts 18 and 20.

The rods 14 and 16 extend upwardly through a cross-bar 22 which is placed diagonally over the top of the cylinder 10 and when the thumb nuts are tightened, the cylinder is held tightly against the base or platform 12. The cross-bar 22 has a block 24 fastened to the bottom of the same by a pair of screw members 26, the block 24 having an axial screw-threaded bore 28 to receive a vertically disposed screw member 30.

I fasten an elongated handle 32 to the top end of the screw 30 and fasten a flat piston member 34 to the bottom of the screw in a non-rotatable manner.

Figure 2:
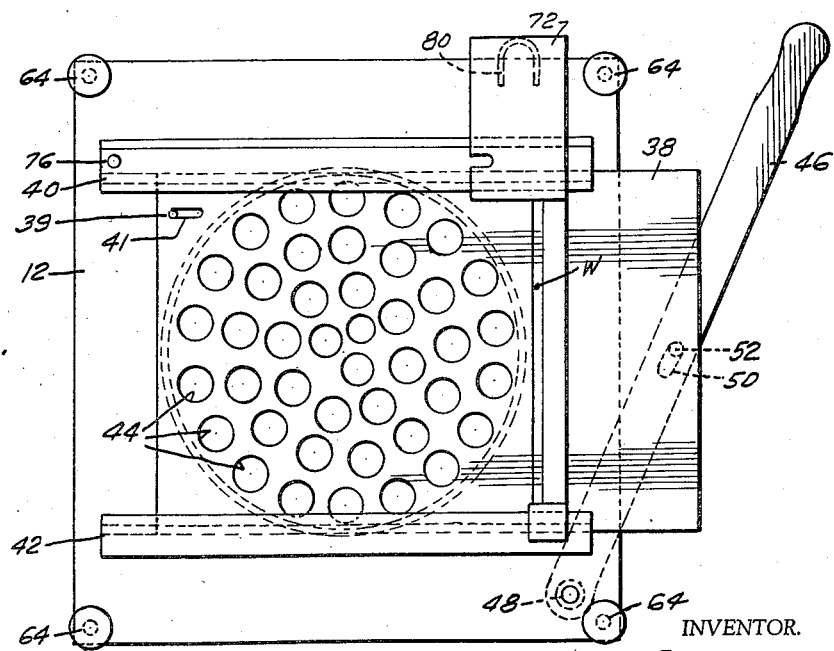
Fig. 2 is a bottom plan view thereof.
Figure 3:
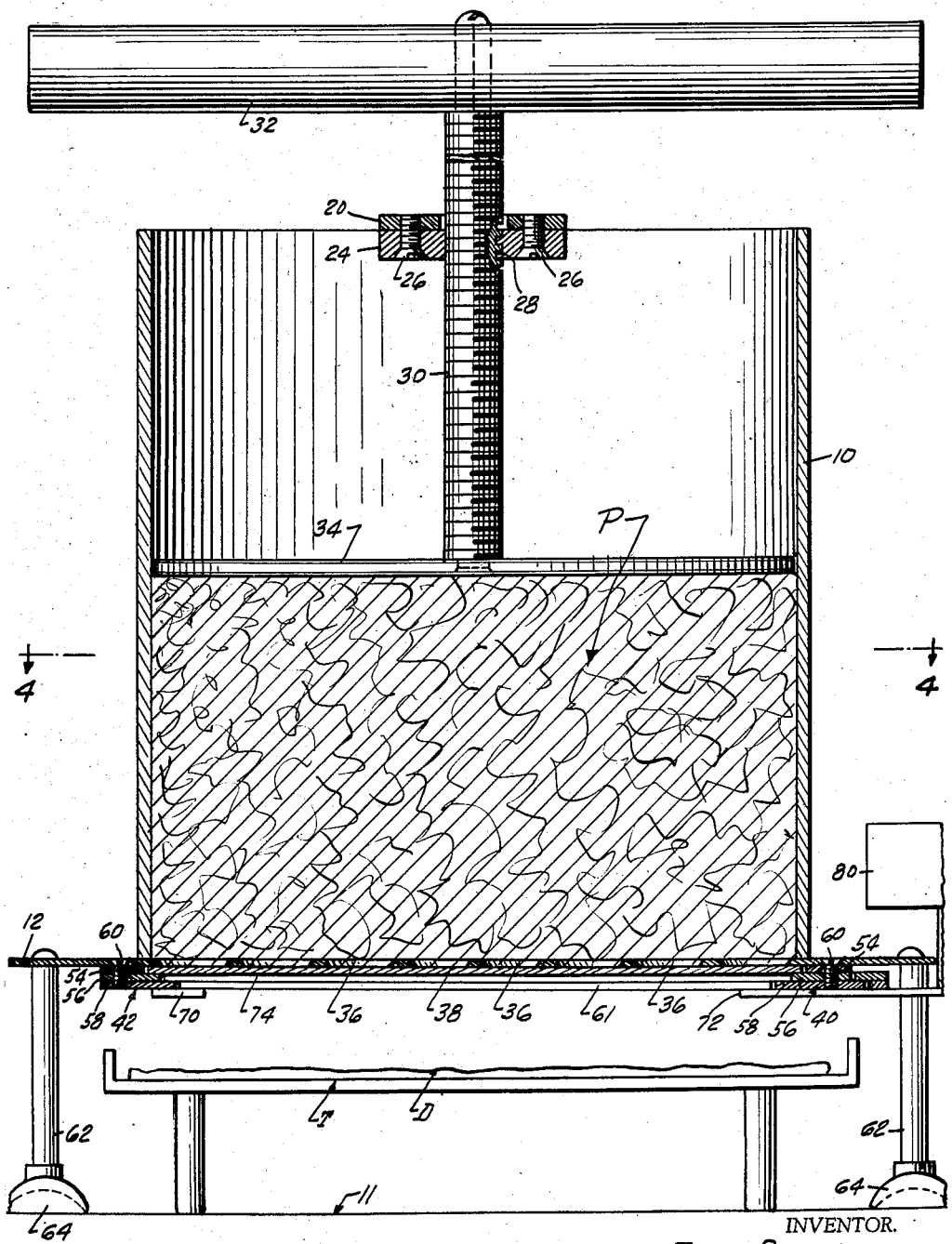
Fig. 3 is a transverse vertical sectional view thereof taken on the line 3—3 of Fig. 1.
Figure 4:
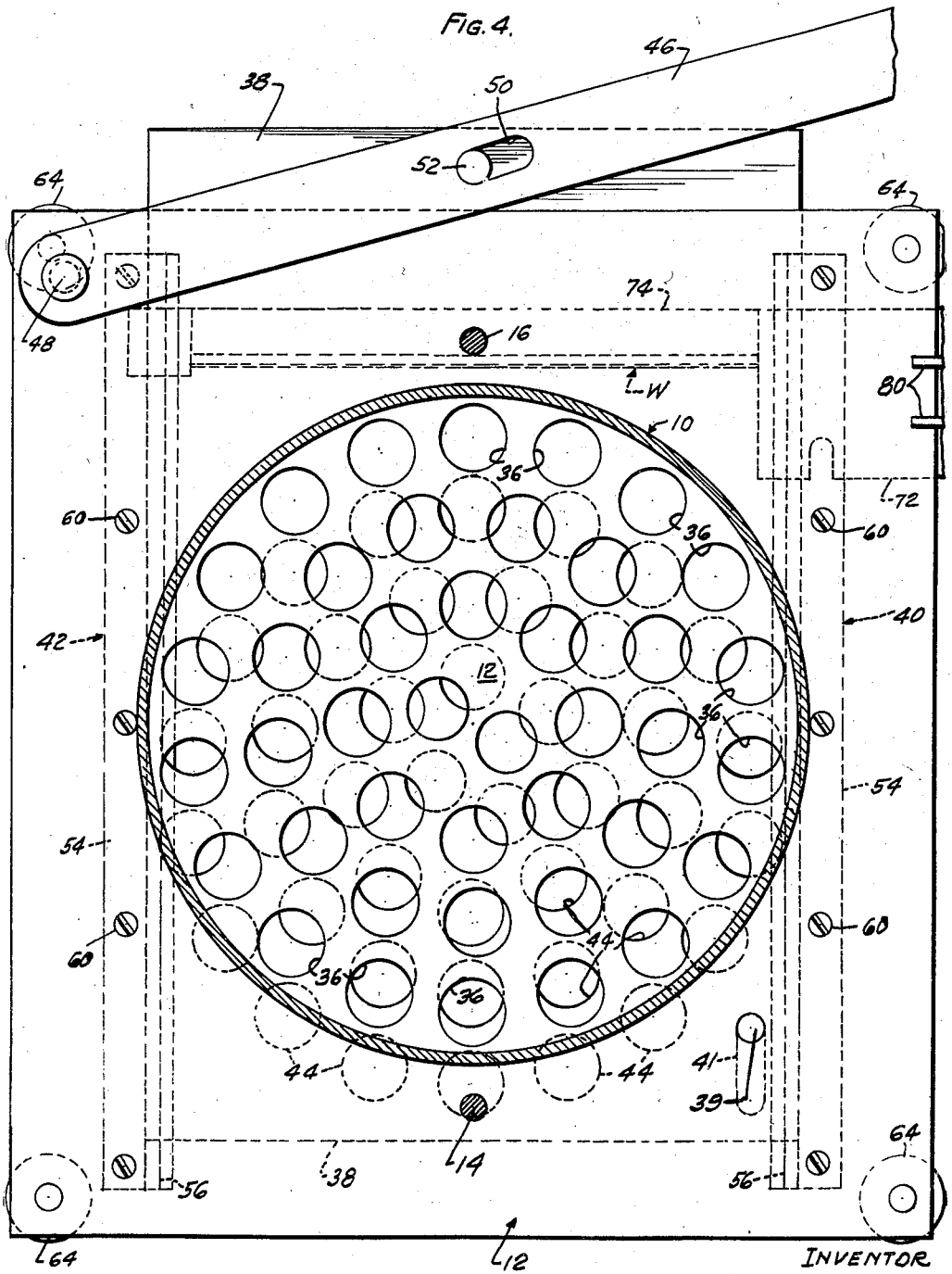
Fig. 4 is a fragmentary plan sectional view showing the cutter plate that has been moved forward in a cutting operation.

The platform 12 may be provided with a plurality of holes or openings 36 distributed throughout a circular area that is surrounded by the wall of the cylinder 10. I position a horizontally movable rectangularly shaped cutter plate 38 below the bottom wall of the platform 12, the same being held and guided for back and forth reciprocal motion by the two guide assemblies 40 and 42. The cutter plate 38 is also provided with holes or openings 44 of the same diameter as the openings 36, and also being so arranged that when the cutter plate is moved to the extreme right as shown in Figs. 1 and 2, there will be a direct equal sized passage through both the openings 36 and 44. Thus when the handle 32 is rotated in a clockwise direction, a piston 34 will press upon the product P in the cylinder 10 and will press or extrude the food product through the aligned openings.

Means for reciprocating the cutter plate 38 may include a hand lever 46 mounted at one end upon a pivot 48 fastened in the platform 12. The handle 46 has an elongated opening 50 to receive a vertically disposed pin 52 that is fastened in the cutter plate 38 and projects upwardly therefrom. When the handle 46 is moved to the left, Fig. 1, the cutter plate 38 will thus be moved forward a sufficient distance to cut off the rods of extruded material that have previously been pressed through the aligned openings. The forward movement of the plate 38 is controlled by a pin 39 extending downwardly from the platform 12 through an elongated opening 41 in the cutter plate 38.

The cutter plate 38 is reciprocated in the guides 40 and 42 as described, the guides comprising flat strips of metal that are fastened underneath the platform 12. The guide 40 may include a spacer strip 54 the thickness of the cutter plate 38, a supporting strip 56 that has a ledge extending beneath one edge of the plate 38, and a third strip 58 which also supports a cutter wire carrier 61 that is mounted below the cutter plate 38. This construction will be hereinafter described in more detail.

The guide 42 is generally similar in construction, and each guide assembly may be fastened beneath the platform 12 by a plurality of screw members 60, as shown.

The platform 12 is positioned on the vertical legs 62 that extend downwardly therefrom, and are provided with feet 64 formed of suction cups so that when the machine is set in position in the kitchen of a pizza pie parlor or restaurant, there will be no tendency for the machine to slide about during its use.

The cutter wire to which I have referred may be held by a wire carrier 73, which includes a pair of brackets 70 and 72, slidably mounted on the guides 42 and 40, and connected by a brace 74, the wire W being connected between the brackets in front of the brace 74.

In use, after extruded lengths of food product have been cut off by the cutter plate 38, the safety wire which is used for cutting also, is moved from the position shown in Fig. 1 across the bottom of the platform and cutter plate, the pin 76 fastened to the bottom of the guide 40 forming a limit stop for the bracket 72, the bracket also having an upturned ledge or handle 80 by which the cutter wire is moved back and forth on the guides 40 and 42. Since sausage, other meat products and anchovies are usually used for making pizza, the food products in the cylinder 10 are often stringy and difficult to cut off cleanly by the edges of the cutter plate openings alone, and for this reason I provide the cutter wire for movement across the entire bottom of the cylinder and cutter plate. I have found that this produces a clean cut and thus each pizza pie can be removed and another piece of dough placed in position, without any of the meat products being spilled about in the vicinity.

A tray T may be set on the table 11 or other surface upon which the machine has been placed, the tray having a circular piece of dough D thereon, the dough having previously received a layer of a tomato product. The cylinder has been filled with ground meat or other food which it is desired to place on the pizza pie dough. The handle 32 is now rotated approximately one turn, the screw 30 being a comparatively large acme thread so that the plunger or piston 34 will move down approximately ¼ inch per rotation. This action forces or extrudes the edible material from the cylinder through the openings in the platform 12 and the cutter plate 38.

After the food has been extruded to a desired length, a push and pull movement of the cutter plate handle 46 moves the cutter plate through the extruded food and cuts off the same, dropping it on the dough. The cutter plate is preferably coated with a plastic material which causes the food to easily release from the cutter plate and drop on to the pie dough in the product holder. A back and forth movement of the safety wire handle 80 causes the safety wire S to pass over all openings to insure that the food has been completely released and dropped to the dough on the product holder.

The safety wire is also preferably coated with parafin or plastic, it having been discovered that such a coating on these elements reduces the possibility of the food product sticking to either of the parts.

In addition, I prefer to make the cylinder 10 of a rigid plastic material that is coated with parafin or Teflon, a plastic coating which is odorless and tasteless, thus reducing the necessity of a length of cleaning time for all of the elements involved.

While in the embodiment of the invention which has been illustrated and described herein I have shown a handle 32 for manual operation of the plunger or piston 34, and handles 46 and 80 for operation of the cutter plate and safety wire, it should be borne in mind that the same may be motor driven and under the control of a timing device so that the sequence of operation may be accurately set, causing in effect an automatic operation to rotate the screw 30 through one revolution, then to operate the cutter plate, and after that has been drawn back, to effect a back and forth movement of the safety wire.

I contemplate that changes and modifications may be made in the exact details shown and I do not wish to be limited in any particular; rather what I desire to secure and protect by Letters Patent of the United States is:

1. The combination with an extruding machine of the type having a horizontally disposed platform, a vertically disposed open-ended cylinder on said platform and a screw-operated piston in said cylinder for pushing material to be extruded downwardly through a plurality of openings in said platform, of a pair of spaced-apart parallel guides fastened below said platform, each of said guides comprising a spacer strip and a supporting strip having an inwardly extending ledge, a rectangularly shaped cutter plate having side edges resting on the ledges of said supporting strips and reciprocal thereon, a hand lever pivotally mounted on said platform and having an elongated opening therein, a pin fastened to said cutter plate and engaging said opening for reciprocating said plate by movement of said lever, said plate having a plurality of openings therethrough capable of alignment with the openings in said platform for permitting extrusion of material therethrough and then reciprocal movement to cut off the extruded portions of material, the length of said reciprocal movement being slightly longer than the length of one of said openings.

2. The combination with an extruding machine of the type having a horizontally disposed platform, a vertically disposed open-ended cylinder on said platform and a screw-operated piston in said cylinder for pushing material to be extruded downwardly through a plurality of openings in said platform, of a pair of spaced-apart parallel guides fastened below said platform, each of said guides comprising a spacer strip and a supporting strip having an inwardly extending ledge, a rectangularly shaped cutter plate having side edges resting on the ledges of said supporting strips and reciprocal thereon, a hand lever pivotally mounted on said platform and having an elongated opening therein, a pin fastened to said cutter plate and engaging said opening for reciprocating said plate by movement of said lever, said plate having a plurality of openings therethrough capable of alignment with the openings in said platform for permitting extrusion of material therethrough and then reciprocal movement to cut off the extruded portions of material, the length of said reciprocal movement being slightly longer than the length of one of said openings, and a wire carrier comprising a pair of brackets slidably mounted on said guides and a cut-off wire connected between said brackets.

3. The combination with an extruding machine of the type having a horizontally disposed platform, a vertically disposed open-ended cylinder on said platform and a screw-operated piston in said cylinder for pushing material to be extruded downwardly through a plurality of openings in said platform, of a pair of spaced-apart parallel guides fastened below said platform, each of said guides comprising a spacer strip and a supporting strip having an inwardly extending ledge, a rectangularly shaped cutter plate having side edges resting on the ledges of said supporting strips and reciprocal thereon, a hand lever pivotally mounted on said platform and having an elongated opening therein, a pin fastened to said cutter plate and engaging said opening for reciprocating said plate by movement of said lever, said plate having a plurality of openings therethrough capable of alignment with the openings in said platform for permitting extrusion of material therethrough and then reciprocal movement to cut off the extruded portions of material, the length of said reciprocal movement being slightly longer than the length of one of said openings, and a wire carrier comprising a pair of brackets slidably mounted on said guides and a cut-off wire connected between said brackets, one of said brackets having an upright handle extending over on one side of said horizontal platform.

References Cited in the file of this patent

UNITED STATES PATENTS

| | | |
|---|---|---|
| 1,171,937 | Fisher | Feb. 15, 1916 |
| 1,215,752 | Walraven | Feb. 13, 1917 |
| 1,564,637 | Snyder | Dec. 8, 1925 |
| 1,946,740 | Hall | Feb. 13, 1934 |
| 1,955,342 | Pizzini et al. | Apr. 17, 1934 |